Sept. 29, 1942.　　　　J. A. SAVAL　　　　2,296,878
SPRING ASSEMBLING MACHINE
Filed Sept. 27, 1940　　　7 Sheets-Sheet 1

Inventor
Joseph A. Saval
By
Attorney

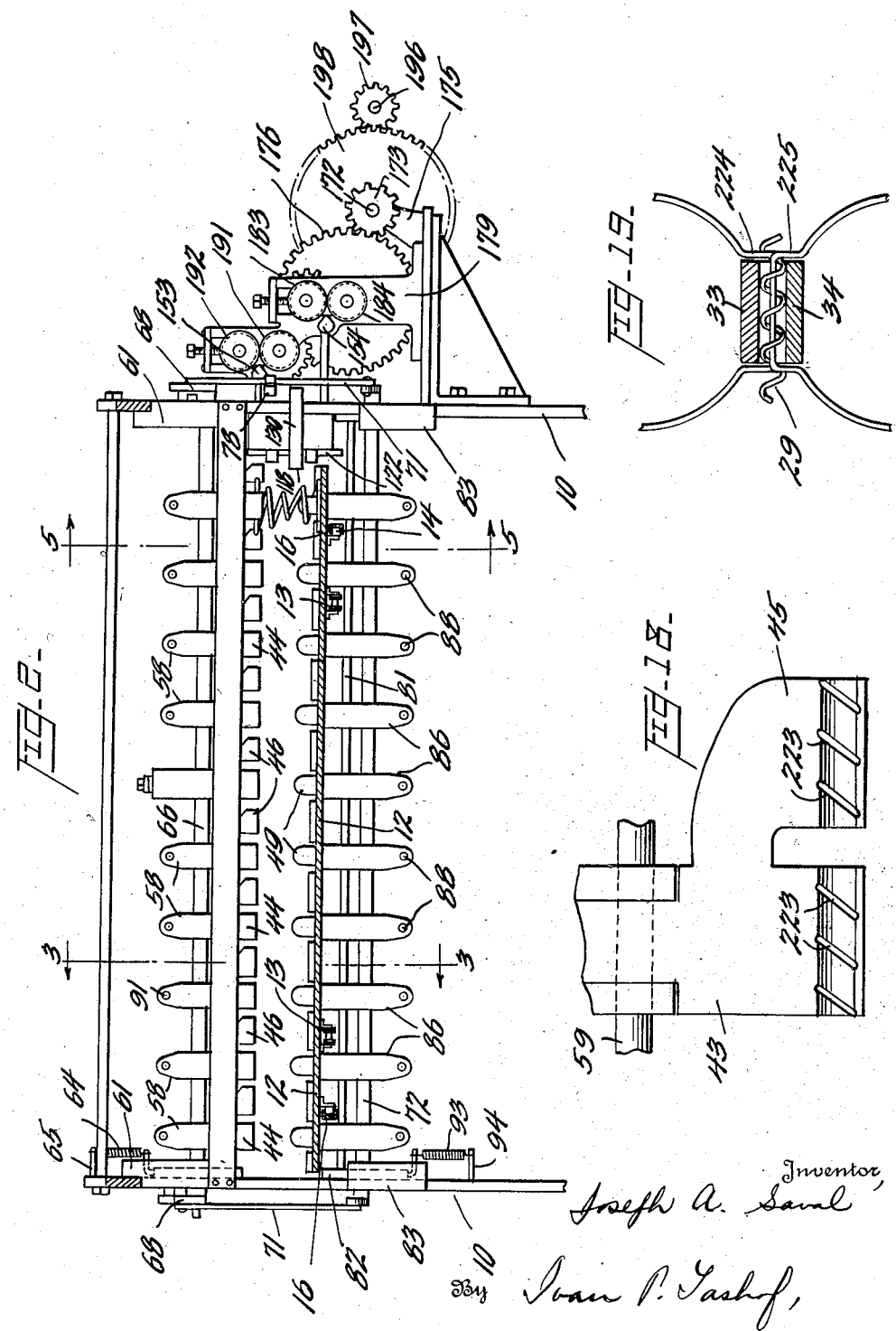

Sept. 29, 1942.   J. A. SAVAL   2,296,878
SPRING ASSEMBLING MACHINE
Filed Sept. 27, 1940   7 Sheets-Sheet 3
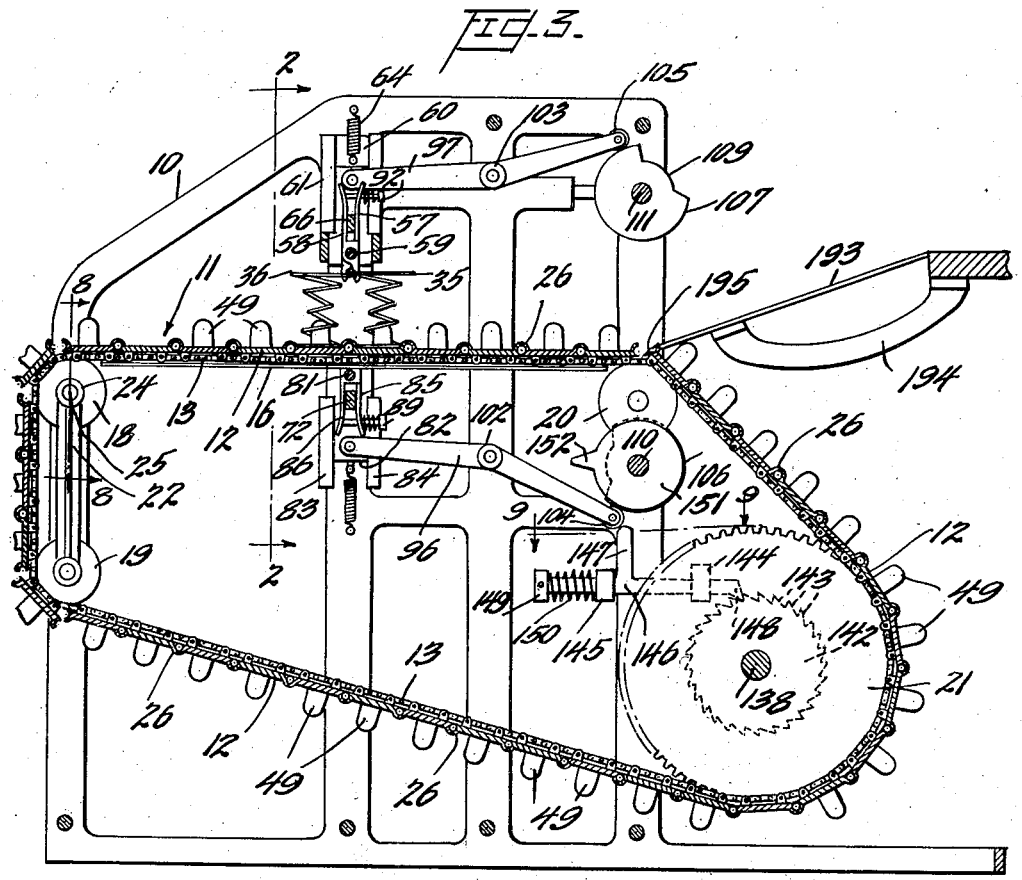
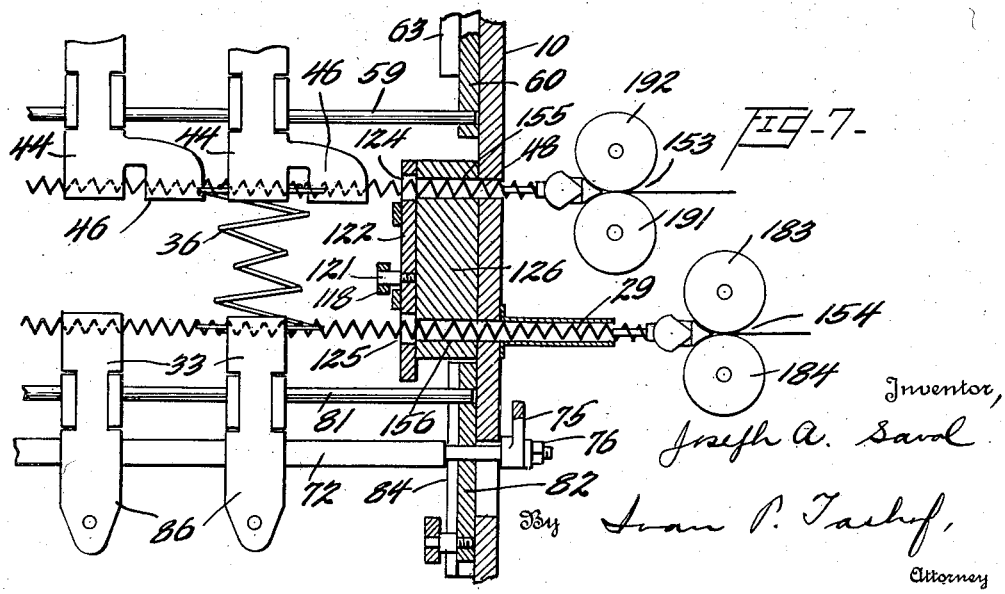
Inventor,
Joseph A. Saval
By Ivan P. Tashof
Attorney

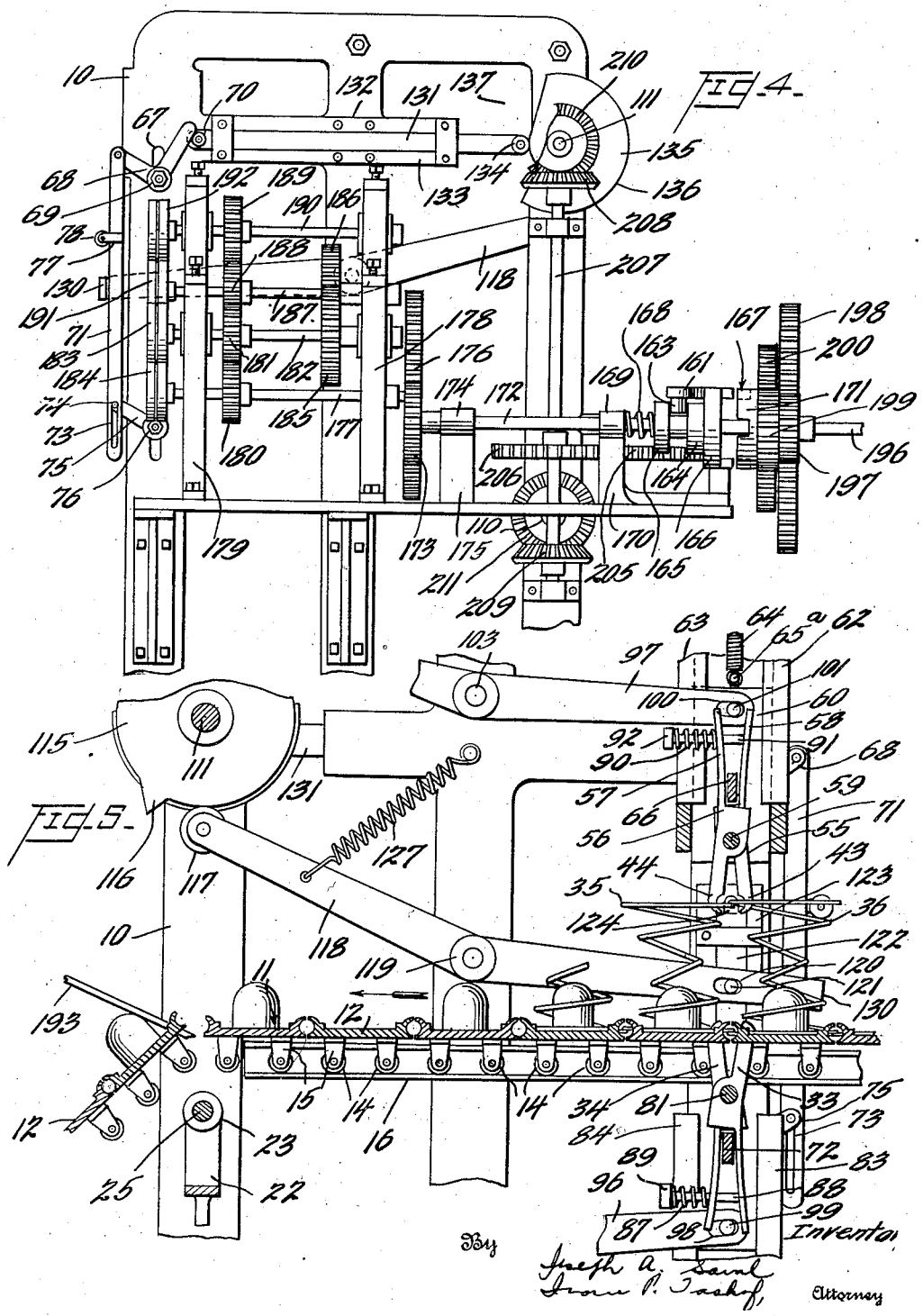

Sept. 29, 1942.   J. A. SAVAL   2,296,878
SPRING ASSEMBLING MACHINE
Filed Sept. 27, 1940   7 Sheets-Sheet 5
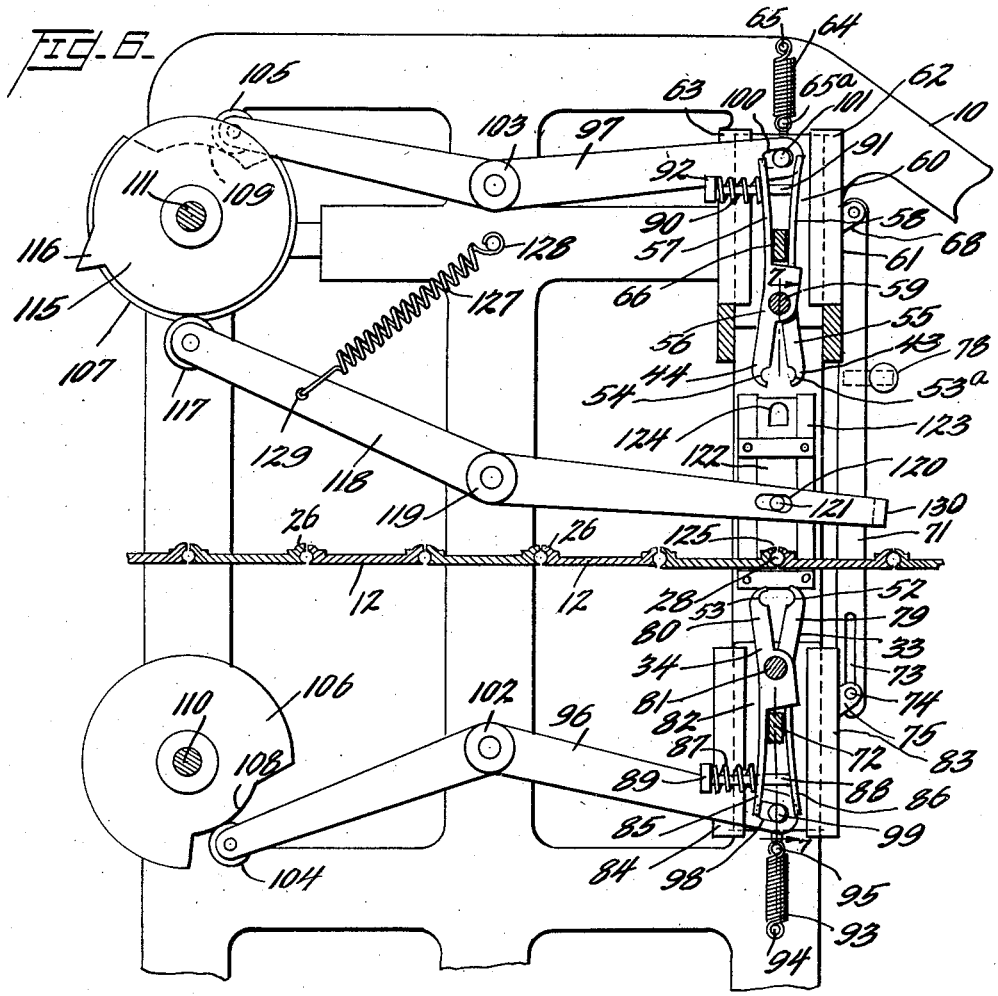
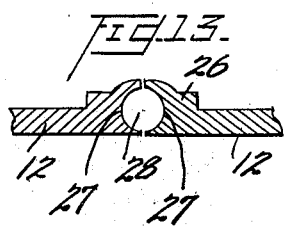
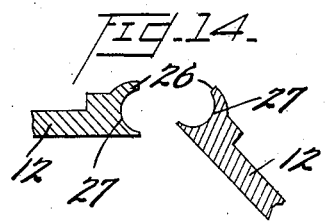
Inventor,
Joseph A. Saval
By Ivan P. Tashof,
Attorney

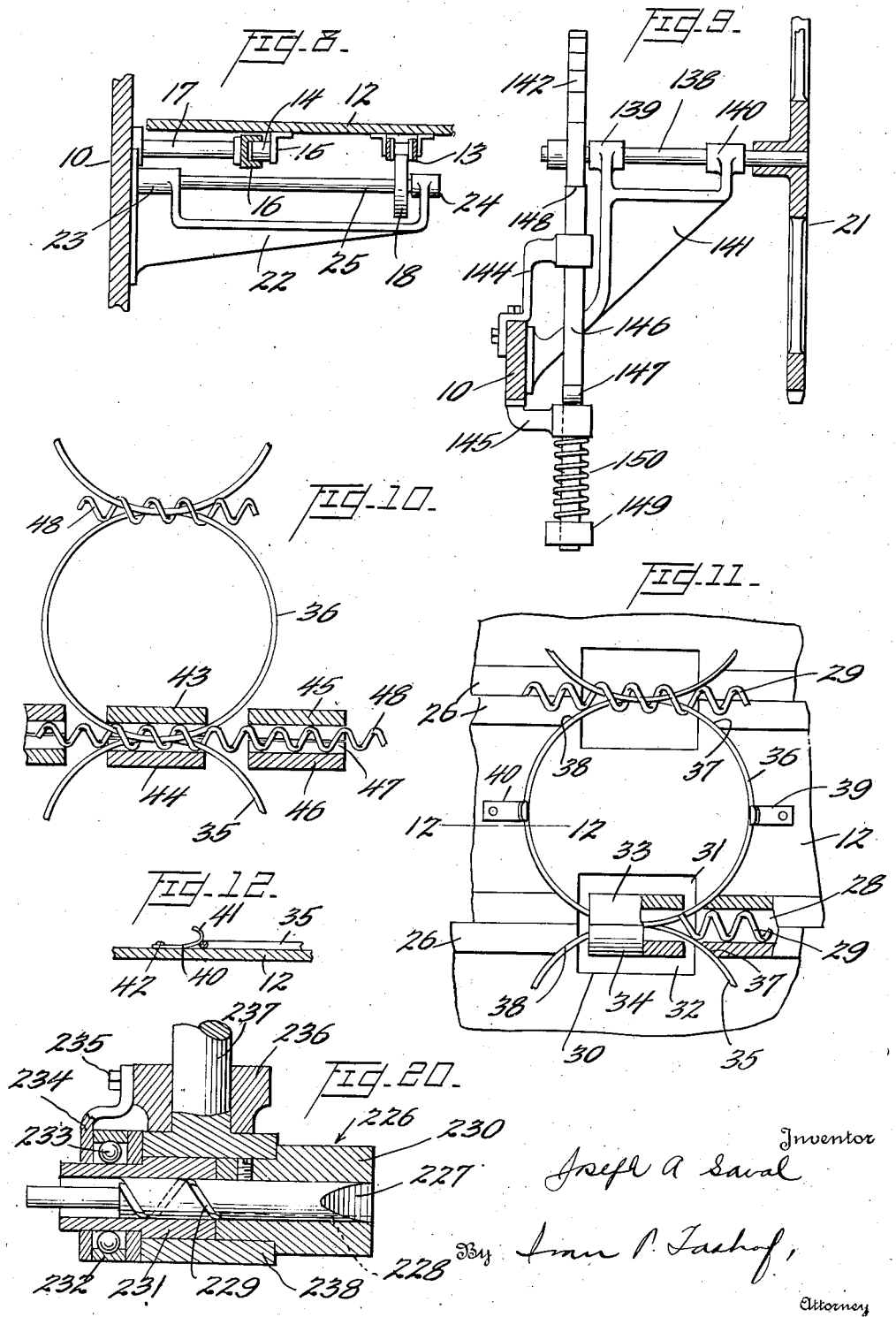

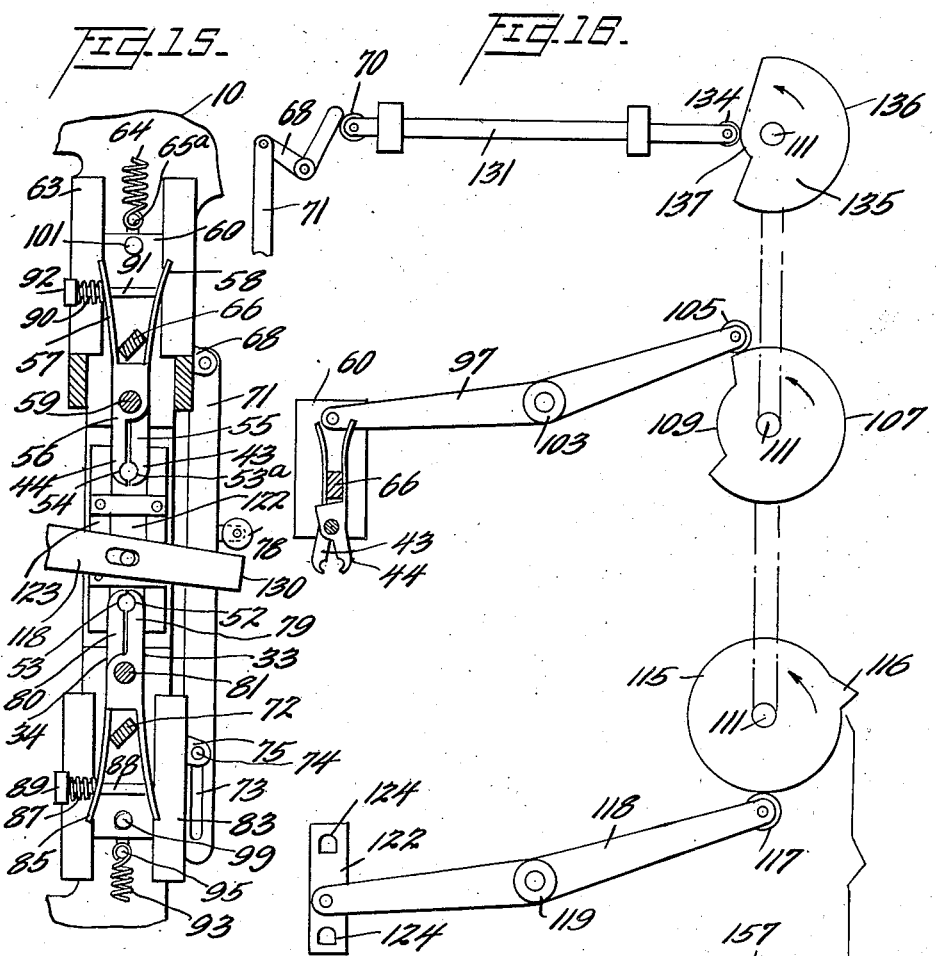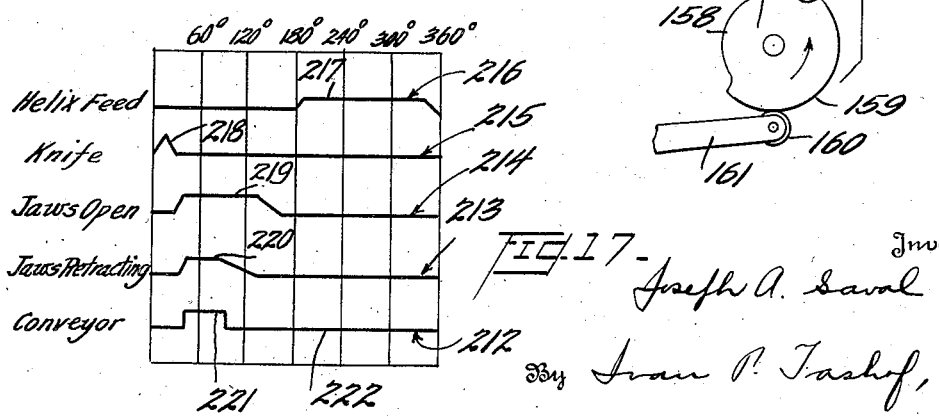

Patented Sept. 29, 1942

2,296,878

UNITED STATES PATENT OFFICE 2,296,878

SPRING ASSEMBLING MACHINE

Joseph A. Saval, Jamaica, N. Y., assignor to Joseph Aronauer, Inc., New York, N. Y., a corporation of New York Application September 27, 1940, Serial No. 358,720

38 Claims. (Cl. 140—3)

The present invention relates to a machine for the assembly of spiral spring members.

More particularly, the present invention relates to a machine for the assembly and tying together of a plurality of rows of spiral spring members into a complete spring assembly capable of use in mattresses, cushions, and similar articles.

Although it has been proposed in the past to provide various types of assembly machines for the fabrication of spring assemblies of the character described, machines of this type were subject to many difficulties. Thus in machines of the character previously known in the art, it was necessary to move the various springs in the assembly into and out of chucks or jaws in order to permit their support and positioning during the tying operation. Naturally, this meant the endless accurate positioning of springs relative to stationary jaws, and the removal of these springs from these jaws necessitated the employment of complex spring ejecting mechanisms which interfered with the smooth operation of the machine.

One of the objects of the present invention, therefore, is to provide a spring assembly machine wherein a plurality of springs are moved in a continuous manner along a conveyor while being assembled.

Still another object of the present invention is to provide a spring assembling machine wherein a plurality of rows of spiral springs are held with portions in adjacent rows in close proximity prior to their linking together by a helical type of tie member.

Still another object of the present invention is to provide a continuous machine for the fabrication of spring assembles wherein the completed spring is easily stripped from the machine as it is being made.

The fourth object of the present invention is to provide a spring assembling machine capable of precise movement for certain definite periods and arrested movement during other periods to permit the threading of a helical tie member through the rows of springs carried by the machine.

The fifth object of the present invention is to provide clamping jaws capable of holding together adjacent portions of springs in succeeding rows prior to the movement of the helical tie member thereabout.

The sixth object of the present invention is to provide coordinating mechanism for the various parts of the machine adapted to time the movements of the conveyor, spring clamping mechanism and helical tie mechanism one with the other during the assembling of the spring structure.

A seventh object of the present invention is to provide a guiding mechanism for a plurality of helical tie members so as to simultaneously enable tying movement of the tie members about the upper and lower portions of spiral springs while positioned on the moving conveyor member.

An eighth object of the present invention is to provide a novel form of helical coiling mechanism for feeding the helical tie member to the machine.

Other objects of the present invention will be apparent from the subsequent description and drawings wherein:

Fig. 2 is a vertical section taken on the line 2—2 of Fig. 3;

Fig. 3 is a vertical longitudinal section of the machine taken approximately along the line 3—3 of Fig. 2, but including the lower portion of the machine;

Fig. 4 is a front elevation of a machine looking towards the left as compared to Figs. 1 and 2;

Fig. 5 is an enlarged longitudinal vertical section of a portion of the machine taken on the line 5—5 of Fig. 2, illustrating the spring holding plates and the spring grasping jaw mechanism;

Fig. 6 is a view similar to Fig. 5, but showing the spring grasping jaws in open position and retracted;

Fig. 7 is a vertical section taken on the line 7—7 of Fig. 6;

Fig. 8 is a detail section taken on the line 8—8 of Fig. 3, illustrating the supporting means for the conveyor;

Fig. 9 is a horizontal section on the line 9—9 of Fig. 3, illustrating the intermittent drive mechanism of the conveyor;

Fig. 10 is a plan view of the upper portion of adjacent spiral springs showing the clamping jaws and helical guides for the upper portions in section;

Fig. 11 is a plan view of a portion of the machine with the clamping jaws and helical guides for the lower portions of the spiral springs shown partly in section;

Fig. 12 is a detail section of the spiral spring holding plates taken on the line 12—12 of Fig.

Figure 1:
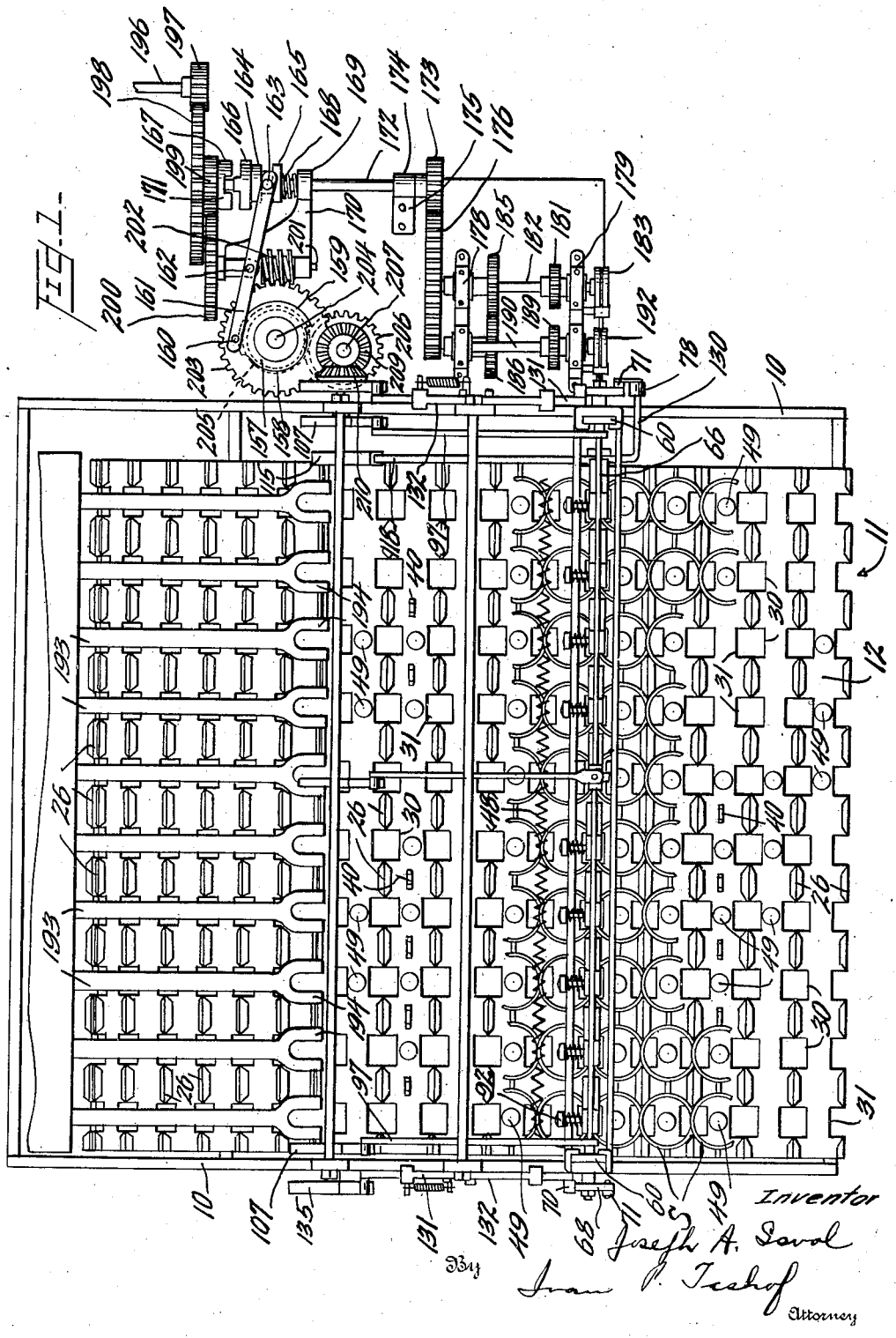
Fig. 1 is a top plan view of the machine showing the positioning of the spiral springs therein.

11, and showing one of the spring retaining members for the spiral springs;

Fig. 13 is a detail enlarged section of a portion of the conveyor plates showing the helical guide member in closed position;

Fig. 14 is a detail section similar to Fig. 13, but showing the helical guide member in open position;

Fig. 15 is an enlarged detail of the machine showing the clamping jaws in operative and closed position;

Fig. 16 is a partial diagrammatic view of certain of the operating cams and the elements operated thereby;

Fig. 17 is a diagrammatic showing illustrating the periods of operation of the various elements of the machine;

Fig. 18 is a detail of a modified upper jaw member and guide provided with spiral grooves;

Fig. 19 is a detail illustrating the operation of the present machine with offset spiral springs;

Fig. 20 is a detail of a novel form of a helix coiling device.

Referring to Figs. 1 and 8 of the drawings, there is here illustrated a conveyor mechanism for the assembly of spiral springs provided with a frame 10 and a conveyor indicated in general at 11 which is suitably supported on the frame 10. The conveyor consists of a plurality of transversely extending rows of plates 12 which are carried and suitably supported by a conveyor chain 13, as shown in detail in Fig. 8. Each of the plates 12 is also supported by rollers 14 suitably journaled on a bracket 15, which may be welded or otherwise suitably affixed to the bottom of the plates 12. The roller 14 is in turn supported by a channel member 16, immovably fixed on the frame 10 of the machine as by a plurality of bars 17.

As shown particularly in Fig. 3, the conveyor chain is supported at its upper rearward portion by the wheel 18; at its lower rearward portion by the rotatable wheel 19; and at its upward forward portion by the rotatable wheel 20. The chain is driven by a relatively large sprocket wheel 21 located at the lower forward portion of the machine. Each of the wheels previously described, it is to be understood, is suitably supported from the stationary frame 10. A support of this character is shown by way of example in Fig. 8, wherein a bracket 22 is provided with a pair of journals 23 and 24 which are adapted to rotatably support the shaft 25 for the wheel 18. It is to be understood that the wheels 19 and 20 are similarly carried by brackets extending from the frame 10, and that each side of the machine is provided with a similar chain supported in a similar manner for respectively supporting a side of the transversely extending plates 12. Each of the plates 12 is provided adjacent a succeeding plate with a plurality of spaced upwardly extending guide portions 26. Each of the guide portions 26 is provided with a semi-circular grooved portion 27, and the two corresponding grooved portions cooperate to form a circular bore, as indicated at 28 in Fig. 13. This bore 28 is normally kept closed, but is open when the conveyor plates carrying the particular portions 26 pass over the wheel 20, as shown in Fig. 3. The position of the plates when the bore 28 is completely closed, as shown in Fig. 13, and the position of the plates with the guide bore open is shown in Fig. 14. The bore in closed position forms a guide for a lower helix, indicated at 29, as will be hereinafter explained. The plates 12 are provided intermediate the raised guide portions 26 with channeled portions.

Referring to Fig. 11, two opposed channels in adjacent plates are indicated at 30 and 31. The channels in adjacent plates, therefore, cooperate to form a rectangularly shaped opening 32 through which a pair of clamping jaws 33 and 34 are adapted to pass. As shown particularly in Fig. 11, these jaws maintain the approximate portions of spiral springs, indicated at 35 and 36 together. It is to be noted that the jaws in this modification are so arranged that in clamping the springs, they nevertheless leave a space for the passage of the helical tie member 29. Still referring to Fig. 11, it will also be noted that the jaws of the raised guide members 26 are cut away to correspond to the circumference of the springs 35 and 36. The shoulders thus formed, and indicated as for example at 37 and 38, help position the bottom of the spiral spring in alinement with the bore 28 so that when the tying helix 29 is fed into the machine, it will be automatically positioned in alinement with the proximate portions of the spiral springs. Means are also provided to temporarily locate the spiral springs and maintain them in position on the plates 12, prior to the clamping action of the jaws 33 and 34. Such a means may consist of a plurality of spring fingers. Two of these spring fingers are shown in Fig. 11 as grasping the lowermost coil of the spring 35, and are indicated at 39 and 40. A detail of a spring finger is shown in Fig. 12. Referring to this figure, it will be noted that the tip of the spring is bent back on itself as at 39 to facilitate the positioning of the spring between the spring finger 40 and the spring finger 39. It will be also noted that one end of the spring finger is suitably fastened to a plate 12 as by a rivet 42. The machine is also provided with grasping jaws and helical guide portions for the upper portions of the spiral springs. Thus referring to Fig. 3, it will be noted that the upper jaws also include grasping members 43 and 44. These members are shown in detail in Fig. 10.

Formed integral with the jaw members, and normally positioned to one side of the jaw members, is a pair of guiding members 45 and 46. When in closed position the jaw members 43 and 44 grasp the upper portions of the spiral springs 35 and 36, and the guiding members 45 and 46 cooperate with one another to form a circular bore indicated at 47, which is adapted to guide the helical tie member between the jaws. A helical tie member for the upper portion of the spring assembly is shown in Fig. 10 indicated at 48. Although the jaws which are adapted to grasp the upper and lower portions of representative spiral springs 35 and 36 have been described as closed, it is understood that these jaws are reciprocatable between closed and open position, and they are also movable toward and away from the conveyor proper in a manner to be hereinafter set forth in detail.

The plates 12 are also provided with a series of positioning pegs 49, as shown in Fig. 1. The purpose of these positioning pegs is to enable workmen to easily and quickly assemble the spiral springs which are indicated collectively in Fig. 1 at S with the plates 12. As shown in Fig. 3, however, two of the series of plates indicated by the reference numerals 50 and 51 are not equipped with pegs. This is to enable the workmen to be advised of the fact that a single spring assembly has been finished. Thus the device, as shown in Fig. 3, is provided with 38 plates, of which two plates are blank plates. When, therefore, eighteen spring units have been supplied to the machine and assembled, a blank plate will pass in front of the workmen and no spiral spring will be mounted on this plate. Inasmuch as the conventional mattress consists of eighteen successive spiral springs in a longitudinal direction, the machine as shown is adapted to assemble the ordinary spring mattress. Obviously, where the machine is used for the assembly of larger mattresses or mattresses having larger numbers of springs in a longitudinal direction, the number of conventional plate members 12 between the blank plates 50 and 51 may be increased. If, on the other hand, the machine is manufacturing spring units for spring cushions and the like which consist of a relatively small number of spiral springs tied together, a greater number of blank plates 50 and 51 may be provided so as to separate the units after any desired number of the spiral springs have been tied together.

In order to facilitate the conversion of the machine for the manufacture of any particular type of spring coil unit, it is desirable to make the pegs 47 removable from the plates 12. This may be effected in any conventional manner, as by mounting the pegs on the plates by means of ordinary machine screws (not shown).

Referring to Figs. 5 and 6, there is here shown in detail the clamping jaws for the upper and lower ends of the approximate portions of spiral springs in successive rows. The jaws in Fig. 5 are shown in position about the approximate portions of the spiral springs 35 and 36, while in Fig. 6 the clamping jaws are shown in retracted position, or, in other words, in their remote position relative to the conveyor. As before stated, the upper jaws consist of a pair of clamping members 43 and 44, while the lower jaws consist of a pair of clamping members 33 and 34. As shown in Figs. 5 and 6, the jaw 33 is formed with an arcuate portion 52 and the jaw 34 is formed with a corresponding arcuate portion 53, so that the jaws are clamped about the approximate portions of the springs 35 and 36, the two arcuate portions will combine to form a circular bore in alinement with the bore 28 of the lower guide members, as may be seen from Fig. 5, although in this figure the jaws 33 and 34 are still in open position. Similarly, the jaws 43 and 44 are provided with arcuate portions 53a and 54 which are also adopted to produce a circular bore when closed, although as previously described, the jaws 43 and 44 are formed integral with movable guide portions 45 and 46, and consequently when the jaws 43 and 44 are closed, they will be alined with the guide bore 47, as shown particularly in Fig. 10.

The jaws 43 and 44 are formed at the lower end of a pair of levers indicated in general at 55 and 56, respectively. Each of these levers 55 and 56 are provided with a tail portion 57 and 58, respectively. The levers are coaxially pivoted to form a composite clamping structure on the transversely extending shaft 59 which extends the entire width of the machine. The ends of the shaft are carried in suitable cross heads in Figs. 5 and 6. One of the side cross heads is shown and indicated by the reference numeral 60. As shown in these figures, the cross head 60 which carries the shaft 59 is mounted for sliding movement within a guide member 61.

Referring particularly to Fig. 1, in this connection, it will be noted that the guide member 61 which is suitably carried by the frame 10 is provided with a pair of opposed wings 62 and 63 adapted to form a pair of opposed channels for the cross head 60. The cross head and jaws are normally held in retracted position by a spring 64, fastened to the frame 10 at 65 and to the cross head 60 at 65a. Also carried by the cross head 60 is a mechanism for opening and closing the jaws 43 and 44. This mechanism consists of an opening and closing cam 66 which is of a general rectangular shape, as seen in Figs. 5 and 6. The cam 66 is shown in operative position in Fig. 15 where the jaws 43 and 44 are shown in closed position and clamping the approximate portions of the springs together.

Referring to Fig. 4, it will be noted that the end of the cam member 66 projects through a slot 67 in the frame 10 and carries on its exterior end an L-shaped lever 68 which is firmly mounted on the cam member 66 as by a nut 69. One leg of the L-shaped lever 68 bears against an actuating roller 70 which is adapted to be actuated by a suitable cam, as will be hereinafter described, while the other end of the L-shaped lever 68 pivotally carries a tie bar 71, which is adapted to actuate the cam member 72 for the lower jaws 33 and 34. As shown in Fig. 4, the tie bar 71 is formed with a slot 73 at its lower end which is adapted to cooperate with a pin 74 carried on the lever 75. The lever 75 is firmly fixed on the end of the actuating bar 72, as by a nut 76. Turning movement of the L-shaped lever 68 will, therefore, impart a similar turning movement to the lever 75, and both of the cam members 66 and 72 will move in unison to open and/or close the jaws 33—34 and 43—44. The bar 71 also carries a laterally extending arm 77, which carries a roller 78 at its outer end for a purpose to be hereinafter described. Referring to the lower clamping jaw assembly, it will be noted that each of the jaws 33 and 34 forms the upper portion of levers 79 and 80, respectively, and that each of these levers is pivoted at 81 to a cross head 82 which is slidably mounted within opposed channels formed by the wings 83 and 84 which are entirely similar in shape and function to the wings 62 and 63 of the upper jaw assembly. Further, each of the lever arms 79 and 80 is provided with tail portions 85 and 86, respectively, which are adapted to cooperate with the cam member 72 to open and close the jaws proper. The lower jaws 33 and 34 are adapted to be maintained in open position by a spring 87, mounted about a pin 88, carried by the tail 86 and passing loosely through the tail 85. As shown particularly in Figs. 5 and 6, the spring 87 bears against the tail 85 at one end and against a head 89 at its other end to bias the lever tails 85 and 86 towards one another, and consequently bias the jaws 33 and 34 toward open position. The upper jaw assemblies are similarly provided with a spring 90 carried by a pin 91, and bearing against the tail 57 at one of its ends, and against the head 92 of the pin 91 at its other end.

Referring once again to the lower jaw assembly, it will be noted that the cross head 82 is maintained in its lowermost position by a spring 93 fastened to the frame 10 at 94, and to the cross head at 95. The cross heads 82 and 60 with their accompanying jaws and other mechanism are moved toward and away from the conveyor plates proper, i. e. from the position shown in Fig. 5 to that shown in Fig. 6 and vice versa, by a pair of levers 96 and 97. The lever 96 operates the cross head 82 through the cooperation of a slot 98 in the lever 96 and a pin 99 which is carried by the cross head 82. The lever 97 is formed with a similar slot 100, cooperating with a pin 101 on the cross head 60. The levers 96 and 97 are pivoted on the frame 10 by means of the hubs 102 and 103, respectively, and the left hand ends of the levers 96 and 97, as shown in Fig. 6, are provided with rollers 104 and 105 which are adapted to cooperate with the cams 106 and 107, respectively.

As shown in Fig. 6, the cams 106 and 107 are provided with cut-away portions 108 and 109, and when the rollers 104 and 105 cooperate with these cut-away portions, the corresponding levers 96 and 97 are rotated on their respective hubs into retracted position, as shown in Fig. 6. Conversely, when the rollers 104 and 105 cooperate with the high portions of the cams 106 and 107, the levers 96 and 97 are turned about their pivots to move the jaw assembly toward the conveyor surface and into the operative position shown in Fig. 15. The cams 106 and 107 are pivoted on shafts 110 and 111, respectively, and as shown in Fig. 1, two such cams are provided at each end of the machine, the upper cam 109 being complemented by an additional cam 112 at the left hand side of the machine. It is to be understood that the cam 106 is also similarly provided with a complementary cam at the lower left hand portion of the machine which is not shown. As shown in Fig. 2, a set of jaws for each spring to be assembled is provided, and it is to be understood that all of these jaws are simultaneously operated since they are mounted side by side on the shafts 59 and 81, and positioned for actuation simultaneously by the cam members 66 and 72. For the sake of stability, however, each side of the machine is provided with actuating cams such as the cam 112, and with a complementary cross head such as the cross head 113 shown in Fig. 1, which has a similar function to the cross head 60 and is similarly journaled within a guide 114. It is to be understood that a similar driving mechanism for the cams and the various elements thus far described is provided and will be hereinafter described in detail.

As shown in Fig. 6, the shaft 111 also carries a cam 115 provided with a projection 116. This cam is adapted to operate the helical tie member cutting mechanism. The cutting mechanism includes a roller 117 carried by a lever 118, pivoted on the frame 10 as by a hub 119. The right hand end of the lever 118, as shown in Fig. 6, is provided with a slot 120 adapted to receive a pin 121 fixed on the knife 122. The knife 122 is slidably mounted within the guide 123. The knife 122 is movable by means of the pin 120 upwardly and downwardly within the guide 123 and, as shown in Fig. 6, is provided with cutting openings 124 and 125 for the upper and lower helical tie member respectively. Movement of the lever 118 in a counterclockwise direction by the projection 116 will, therefore, move the knife 122 upwardly and the lower edges of the openings 124 and 125 will cooperate with a block 126 to cut the helical tie members 29 and 48. A section of the knife 122, showing the openings 124 and 125 is shown in detail in Fig. 7, as is also the block 126. It is to be understood that the lever 118 is normally kept in an extreme clockwise position by the spring 127 which is formed with a hook at each of its ends adapted to enter the opening 128 in the frame 10 and the opening 129 in the lever 118.

Referring to Figs. 4 and 6, it will be noted that the lever 118 is provided with an end 130 which projects beyond the periphery of the machine and around the tie bar 71. During the upward movement of the knife, this portion of the lever contacts the roller 78, and thus serves to positively return the jaws 33 and 34 and 43 and 44 to open position, thus augmenting the action of the springs 87 and 90, and positively preventing the engagement of the spiral springs and helical tie members by the jaws when they are moved to retracted position.

Referring once again to Fig. 4, it will be noted that the above positive returning action is necessary because of the one way arrangement for the actuation of the turning cams 66 and 72. Thus the L-shaped lever 68 is rotated in a counterclockwise direction by the roller 70 carried by the push rod 131 which is journaled for reciprocating motion between the guide member 132 and 133 carried by the frame 10. The push rod 131 is provided at the end remote from the roller 70 with a second roller 134 which is adapted to cooperate with a cam 135 coaxially mounted with the cams 107 and 115 on the shaft 111.

The cam 135 is provided with a high portion indicated at 136 and a low portion indicated at 137, and when the roller 134 moves from the low portion to the high portion, it is reciprocated within the guides 132 and 133 to move the roller 70 and through the roller the lever 68 and the jaw opening cams.

Referring to Figs. 3 and 9, it will be seen that the sprocket wheel 21 which meshes with and drives the conveyor chain 13 is rotatably mounted on a shaft 138 which is carried by the journals 139 and 140, formed integrally with the bracket 141, suitably bolted or otherwise fastened to a portion of the machine frame 10. Also mounted on the shaft 138 to rotate therewith is a ratchet wheel 142, provided with the ratchet teeth 143. Also mounted on the frame 10, as shown in Fig. 9, is a pair of alined supporting brackets 144 and 145, having alined central openings adapted to receive a pawl member 146. The pawl member 146 is provided with an upwardly extending arm 147, a forwardly extending pawl proper 148, and a head 149 which is located at its rearward extremity. Coiled about the pawl member 146 between the bracket 145 and the head 149 is a spring 150 which is adapted to maintain the pawl member in its retracted or rearward position. The arm 147 of the pawl member extends upwardly in alinement with a cam 151, which is mounted on the shaft 110 to rotate with the shaft and the cam 106, as shown in Fig. 3. The cam 151 is provided with a single tooth or projection 152 and once during each revolution of the cam 151 the tooth 152 comes in contact with the upwardly extending arm 147 and moves the arm to the right, as shown in Fig. 3, similarly moving the pawl member 146 and the pawl 148. At each of these movements, the ratchet wheel 142 is moved a single tooth to correspondingly move the shaft 138 and the sprocket wheel 21. The cam, pawl, ratchet wheel and sprocket wheel are so proportioned that the conveyor chain 13 will be moved a distance corresponding to the width of a single plate 12, and each of these movements will, therefore, bring into alinement a new row of springs and corresponding parts, as will hereinafter be set forth in detail.

The assembling machine, according to the present invention, is also provided with a pair of coiling devices which may be of a more or less conventional construction. These coiling devices are adapted to coil the tie helixes 29 and 48 from straight wire of any suitable gauge, and are indicated in general in Figs. 2 and 7 by the reference numerals 153 and 154. It will be understood that each of the coilers 153 and 154 when operating is adapted to turn out and rotate the helical tie members 48 and 29, as shown in Fig. 7. The helical tie member 48 is fed from the coiler 153 through the opening 155 in the cutting block, and the opening 124 in the knife 122, through the circular opening 47 in the upper guide, and then between the jaws 43 and 44 and around the proximate portions of the spiral springs successively the entire width of the machine. Similarly, the helical tie member 29 is fed through the opening 156 in the cutting block 126 and the opening 125 in the knife 122, through the stationary guide openings 28 formed by the guide members on adjacent edges of the plate 12, and then through the opening between the jaws 33 and 34 and around successive proximate portions of the spiral springs. A helix thus threaded through guide portions and openings is shown in Figs. 10 and 11, previously described. The operation of the coilers is controlled by a cam 157, provided with a low portion 158 and a raised portion 159, and geared to rotate with the cams previously described. Bearing on the cam surface is a roller 160 carried by the end of a lever arm 161, suitably pivoted at 162, as shown in Fig. 1. The end of the lever arm 161, remote from the roller 160, carries a pin 163 which is adapted to fit between a pair of rotatable bushing members 164 and 165. The bushing members 164 and 165 are mounted to rotate with one of the plates 166 of a clutch indicated in general at 167. Bearing on one face of the bushing member 165 is a spring 168 which bears at its other end on a journal 169 carried by a stationary bracket 170. The spring 168 normally tends to move the bushing member 165 and the clutch plate 166 upwardly, as shown in Fig. 1, and to the right as shown in Fig. 4. The spring 168 thus has the dual function of maintaining the clutch in engagement and rotating the lever 161 in a counterclockwise direction, as seen in Fig. 1, so as to maintain the roller 160 in firm contact with the surface of the cam 157.

As shown in Fig. 1, the clutch is disengaged, which is the normal position of the clutch when the roller 160 is in contact with the elevated surface 159 of the cam 157. When the roller 160 moves downwardly on the cam 157 to engage the lowermost portion of the cam surface 158, the lever 161 is moved in a counterclockwise direction and the clutch plate 166 is moved upwardly to engage the complementary clutch plate 171. The engagement of the clutch plates 166 and 171 will rotate the bushing members 164 and 165, together with the shaft 172 upon which these bushing members are fixed. The rotation of the shaft 172 will similarly rotate and pinion 173. It will be understood that the shaft 172 is suitably supported by a bearing 174 carried by a standard 175, in addition to the bracket 170 and the bearing or journal 169, previously described. The pinion 173 drives the gear wheel 176 fixed on the shaft 177, mounted for rotation in the bearings 178 and 179. Also fixed on the shaft 177 is the gear wheel 180, which in turn drives the gear wheel 181 fixed on the shaft 182. The shafts 177 and 182 carry at their forward ends the feeding wheels 183 and 184 for the lowermost helical feed which has been previously indicated in general by the reference numeral 154 in Fig. 7. The shaft 182 also carries a gear wheel 185, which drives the gear wheel 186 carried by the shaft 187. The shaft 187 drives by means of the gear 188 still another gear 189 on the shaft 190. The forward ends of the shafts 187 and 190 carrying the two feeding wheels 191 and 192, respectively, for a second coiling and feeding mechanism for the upper helical, this coiling and feeding mechanism being indicated in general by the reference numeral 153 in Fig. 7.

Means are also provided in the spring assembling mechanism of the present invention to remove the spring assembly from the conveyor plates 12. As shown in Figs. 1 and 3, this mechanism includes a plurality of rods 193, suitably supported by a bracket 194. Each of these rods is provided with a bifurcated end 195 which is adapted to contact each of the tied springs passing off the conveyor and lift the same against the action of the positioning springs 39 and 43. This is rendered possible, as shown in Figs. 3 and 14, by the opening of the guide members 26 on passage of the conveyor chain and plates 12 over the wheel 20, the opening of the guide members 26 thus permitting the disengagement of the tie helix from between the guide members and the bore 28.

The entire machine thus described is driven from a drive shaft 196, provided with a driving pinion 197, as shown in Fig. 1. The pinion 197 drives the gear wheel 198 which has fixed thereto a pinion 199 adapted to carry the clutch plate 171, previously described. The pinion 199 in addition to driving the clutch also drives a gear wheel 200, fixed on the shaft 201, which is suitably carried by the bracket 170. The rear end of the shaft 201 has fixed thereon a worm 202 which in turn meshes with and drives a worm wheel 203 fixed on the shaft 204, which also carries the clutch operating cam 157, previously described. Also carried on the shaft 204 is a gear 205, indicated in dotted lines in Fig. 1. The gear 205 meshes with the gear 206, fixedly carried on the shaft 207. The shaft 207 in turn carries at each of its ends beveled gears 208 and 209, as shown in Fig. 4. The gears 208 and 209 mesh with similar beveled gears 210 and 211, respectively, carried on the shafts 111 and 110. As previously described and shown in Fig. 16, the shaft 111 carries and operates the cams 107, 135 and 115, the cam 107 being adapted to raise and lower the cross head 60 for the upper jaws 43 and 44 through the medium of the lever 97 and the roller 105. The cam 135 is adapted to operate the turning bar or cam 66 for closing the jaws by means of the push rod 131 and the L-shaped lever 68, as prevoiusly described. The cam 115 operates the knife 122 through the roller 117 and the lever 118. The shaft 110 which, as previously described, is also driven by the shaft 207 through the beveled gear 209 and the gear 211, is adapted to operate the cross head 82 which carries the lower members 33 and 34, the cross head 82 being operated from the cam 106 by the lever 96 and the roller 104. The timing of the various operations of the device is shown diagrammatically in Fig. 17, wherein the curve 212 illustrates the motion of the conveyor; the curve 213 the retracting movement of the jaws; the curve 214 the opening movement of the jaws; the curve 215 the cutting movement of the knife; and the curve 216 the helix feed.

Referring to Fig. 17, it will be noticed that the high portion of these curves corresponds in general to the actuating portions of the cams. Thus the high portion 217 of the curve 216 extends over approximately 180° and corresponds to the high portion 159 of the cam 157. Similarly, the high portion 218 of the curve 215 corresponds to the high portion of the cam 115. The high portion 219 of the curve 214 corresponds to the low portion 137 of the cam 135, and the high portion 220 of the curve 213 corresponds to the low portion of the cam 107. The movement of the conveyor, as exemplified by the curve 212, does not, strictly speaking, correspond to the actuating portion 152 of the cam 151, inasmuch as the action of this actuating portion resembles that of a simple finger or pushing mechanism for the pawl 148 which serves to move the conveyor for a definite distance and time period, corresponding to a single plate 12. The period of movement of the conveyor is illustrated in the curve 212 by the high portion 221, and the period of rest of the conveyor by the low portions 222.

The operation of the spring assembly mechanism, according to the present invention, is as follows: the rotation of the drive shaft 196 drives the conveyor mechanism through the driving linkage, including the pinion 197, gear wheel 198, pinion 199, gear wheel 200, worm 202, worm wheel 203, gear wheel 205, gear wheel 206, beveled gear 209, beveled gear 211, shaft 110, cam 151, finger 147, pawl 148, ratchet 143, and sprocket wheel 21. The action of the various gears just hereinbefore described, and proportioning thereof, is such that the conveyor is driven for a definite period of time, as shown in Fig. 17, corresponding to approximately 60°. This takes place shortly after the movement of the knife 122, as shown by the high portion 218 of the curve 215, the action of the knife terminating a preceding tying cycle of the helix and spiral springs. It is to be understood that the spiral springs are continuously fed to the successive rows and positioned by means of the pegs 49 on the left hand portion of the machine, as shown in Fig. 3, and that when positioned these springs are temporarily held in place by spring fingers such as the spring fingers 39 and 40 shown in detail in Figs. 11 and 12. At the time that the conveyor has moved to bring a new row of springs into position, the upper and lower jaw members 33—34 and 43—44 which have been in retracted position (corresponding to the high portion 220 of the curve 213), are moved toward the conveyor plates 12. At this time, the jaws are also open, as shown by the high portion 219 of the curve 214. It is desired to point out that the cams which move the jaws, namely the cams 107 and 106 are driven from the shafts 111 and 110, and that the shaft 110 is driven as described in connection with the movement of the cam 152. Similarly, the cam 111 is correspondingly driven at precisely the same speed by the corresponding beveled gears 208 and 210 which serve to drive the shaft 111.

After the movement of the conveyor, therefore, has been effected to place a new roll of spiral springs in alinement with the coilers 153 and 154, the upper jaws are lowered and the lower jaws are moved upwardly until the lower jaw members pass through the openings 32 and surround the proximate portions of the springs 35 and 36. During this movement, the jaws are in open position, as shown in Fig. 5. Similarly, the upper jaws 43 and 44 are moved into position around the proximate upper portions of the springs 35 and 36. When the upper jaws are moved into position, the guide members between the upper jaws are moved into alinement with the proximate upper portions of the springs. The cam 135 which is carried on the upper shaft 111 is then moved to close the jaws, the closure being maintained throughout the low portion of the curve 214. As before described, the closure of these jaws is effected through the cooperation of the push rod 131 and the roller 134 with the cam 135. Movement of this push rod rotates the cam members 66 to close the upper jaws 43—44 and the guides carried thereby, and at the same time to close the lower jaws 33 and 34 about the proximate portions of the springs 35 and 36. It is to be understood, as shown in Figs. 1 and 2, that this jaw movement takes place transversely across the entire row of springs. After the jaws have been closed, the clutch cam 157 brings together the clutch plates 166 and 167, so that the coilers are driven for approximately 180° or, as shown in Fig. 17, during the period corresponding to the time between the 180° mark and the 360° mark, the movement of the knife being accepted as the zero degree point. The closure of the clutch plates, as previously pointed out, drives the coilers through the linkage, including the clutch plate 167, the shaft 172, gear 173, gear 176, shaft 177, and the gear train, including the gears 181, 185, 186, 188 and 189. It is to be noted that the upper coiler is driven in an opposite direction, as compared to the lower coiler. The gears are so proportioned that the speed of movement of the helixes 29 and 48 rotating out of the coilers, is sufficient to completely encircle all of the proximate portions of the springs across the entire transverse distance of the conveyor.

As previously pointed out, the lower helix 29 is fed through the guide bores 28 and the jaws 33 and 34, and the upper helix tie member 48 is fed through the guide bores 47 and between the jaw members 43 and 44. After the movement of the helix is complete to tie an entire row of springs to a preceding row, the high portion of the cam 115 raises the roller 117, as shown for example in Fig. 16, and through the roller 117 and the lever 118 actuates the knife 122 which cuts both the upper and lower helix, thus starting a new cycle of operation, as previously described.

In Fig. 18, a modified upper guide member is shown, provided with helical grooves 223 both in the guide member 45 and jaw 43, although only one-half of the jaw and guide member is here shown. It is to be understood that the other jaw and guide member are also provided with this type of helical groove. Although this arrangement will facilitate the winding of the rotating helix around the proximate portions of the spring, it is to be understood that this type of construction is not essential, and that sufficient space is ordinarily left in the ordinary jaw members and guide to allow the helix to pass through the same and tie the proximate portions of the springs.

In Fig. 19, the jaws are shown applied to a conventional type of offset spring, the two proximate offset portions being indicated by the reference numerals 224 and 225. It is to be understood that the device of the present invention may be applied to the offset type of spring or any other suitable type of spring construction without substantial modification.

In Fig. 20 a novel form of helical former or coiler is shown, indicated in general by the reference numeral 226. This coiler includes a central shaft or rod 227, provided with a longitudinal groove 228 communicating with a helical groove 229. Fixed to the rod 227 is a bushing or jacket 230, and rotatable relative to the rod 227 is a second bushing or jacket 231 which is capable of rotation relative to the rod 227 and the bushing 230. The ball bearing mounting which permits this rotation consists of a race indicated at 232, provided with the balls 233. The balls are held in position within the race by the cover plate 234 which, as shown, is bolted as by bolts 235 to the support mount or standard 236 which is in turn fixed to an immovable portion of the machine frame not shown. The support mount 236 carries the support proper 237, which is provided with a bearing or collar 238 adapted to turnably surround both the fixed jacket 230 and the movable jacket or bushing 231. It is desired to point out that by dividing the surrounding bushing for the shaft 227 into two parts and by making the bushing 231 movable, the coiler as described does away with undue wear of the jacket member surrounding the spiral portion of the groove. As will be understood, in the conventional machines of this character, the wire is threaded through the groove 228 as by wheels of the character shown in connection with the coilers previously described, these wheels being indicated by the reference numerals 183, 184, 192 and 191. In the conventional type of coiler, however, the bushing 231 is not provided with a ball bearing, and is fixed relative to the rod 227. When the wire is threaded through the helical groove 229, therefore, the friction between the wire and the internal bore of the bushing 231 in time wears this bushing and prevents satisfactory operation of the collar. By providing a separate bushing 231 for this portion of the rod 227, the jacket or bushing moves with the wire and undue wear is prevented.

It may thus be seen that by proceeding in accordance with the present disclosure, there is provided a spring assembling machine including a conveyor capable of supporting a plurality of transversely extending rows of spiral springs so that portions of springs in one row are positioned in proximity to corresponding portions of springs in a second row. In addition, it will be seen that means are provided in accordance with the present invention to periodically move a tie member around the proximate portions of the springs to complete a spring assembly. The conveyor in accordance with the present invention is accurately timed and moved to bring a new set of springs into alinement with the helical tie member, and the helical tie member is cut in time to permit this movement of the conveyor and rows of springs.

Although the device has been described principally in connection with conventional spiral springs capable of being assembled into the conventional innerspring unit for mattresses, cushions and the like, it is to be understood that the principles here disclosed are equally applicable to all types of spring constructions whether the springs have the conventional spiral shape or some other shape.

What is claimed is:

1. In a spring assembling machine, a conveyor member, means on said conveyor member for supporting a plurality of transversely extending rows of spiral springs so that portions of springs in one row are positioned in proximity to corresponding portions of springs in a second row, means to periodically move a spring tie member in a fixed path transversely of said conveyor and around the proximate portions of said springs to tie the same, and means to intermittently move said conveyor member to bring a new row of springs into alinement with the path of movement of said spring tie member.

2. In a spring assembling machine, a conveyor member, means on said conveyor member for supporting a plurality of transversely extending rows of spiral springs so that portions of springs in one row are positioned in proximity to corresponding portions of springs in a second row, a helical tie member guide on said conveyor member in alinement with the proximate portions of said springs, means to periodically move a helical tie member through said guide member and transversely of said conveyor around the proximate portions of said springs to tie the same, and means to move said conveyor member intermittently to bring a new row of springs, and a second helical tie member guide means into alinement with the means to move the helical tie member.

3. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a helical spring tie member in a fixed path transversely of said conveyor and around the proximate portions of said springs to tie the same during the period of rest of said conveyor, and means to cut the helical tie member prior to a new period of movement of said conveyor.

4. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a helical spring tie member in a fixed path transversely of said conveyor and around the proximate portions of said springs to tie the same during the period of rest of said conveyor, means to cut the helical tie member prior to a new period of movement of said conveyor, and means to move clamping members about the proximate portions of said springs during the period of rest of said conveyor so as to hold the proximate portions of said springs together while being tied by said helical tie member.

5. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a guide member for a helical spring tie member transversely of said conveyor and into alinement with proximate portions of said springs during the period of rest of said conveyor, and means to move a helical spring tie member through said aforementioned guide member and around the proximate portions of said springs to tie the same during the period of rest of said conveyor and after the movement of the guide member.

6. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a helical spring tie member in a fixed path transversely of said conveyor and around the proximate portions of said springs to tie the same during the period of rest of said conveyor, means to cut the helical tie member prior to a new period of movement of said conveyor, means to move clamping members about the proximate portions of said springs during the period of rest of said conveyor so as to hold the proximate portions of said springs together while being tied by said helical tie member, and means to close said jaws on the proximate portions of said springs prior to the movement of said helical spring tie member.

7. In a spring assembling machine, a conveyor member, means on said conveyor member for supporting a plurality of transversely extending rows of spiral springs so that portions of springs in one row are positioned in proximity to corresponding portions of springs in a second row, means to periodically move a spring tie member in a fixed path transversely of said conveyor and around the proximate portions of said springs to tie the same, means to intermittently move said conveyor member to bring a new row of springs into alinement with the path of movement of said spring tie member, spring means to retain said spiral springs on said conveyor and means to strip the assembled springs from said conveyor.

8. In a spring conveying and assembling mechanism a movable conveyor member including a series of linked plates movable therewith, means on each of said plates to support a spiral spring and cooperating means on the adjacent edges of said plates for guiding a spring tie member.

9. In a spring assembling machine, a conveyor member including a series of linked plates, means on each of said plates to support a row of spiral springs so that portions of springs in one row are positioned in proximity to corresponding portions of springs in a second row, cooperating means on the adjacent edges of said plates for guiding a spring tie member transversely of said conveyor, means to move said spring tie member through said cooperating guiding means and around the proximate portions of said springs to tie the same, and means to intermittently move said conveyor member to bring a new row of plates and cooperating means into alinement with the path of movement of said spring tie member.

10. In a spring assembling machine, a conveyor member including a series of linked plates, means on the edge of each of said plates to position a row of spiral springs so that portions of springs in one row are positioned in proximity to corresponding portions of springs in a second row, cooperating means on the adjacent edges of said plates in successive rows, each of said means having a semi-circular form so as to constitute a circular bore for guiding a helical spring tie member transversely of said conveyor and around the proximate portions of said springs to tie the same, means to move a helical spring tie member through the circular bore of the guiding means and around the proximate portions of said springs to tie the same and means to intermittently move said conveyor member to bring a new row of plates and corresponding means into alinement with the path of movement of said helical spring tie member.

11. In a spring assembling machine, a conveyor member including a series of linked plates, means on each of said plates to support a row of spiral springs so that portions of springs in one row are positioned in proximity to corresponding portions of springs in a second row, cooperating means on the adjacent edges of said plates for guiding a spring tie member transversely of said conveyor, means to move said spring tie member through said cooperating guiding means and around the proximate portions of said springs to tie the same, means to intermittently move said conveyor member to bring a new row of plates and cooperating means into alinement with the path of movement of said spring tie member, and means to move one plate relative to the next plate so as to open said cooperating guiding means and permit the removal of said tie member therefrom.

12. In a spring assembling machine, a conveyor member including a series of linked plates, means on the edge of said plates to position a row of spiral springs so that portions of springs in one row are positioned in proximity to corresponding portions of springs in a second row, cooperating means on the adjacent edges of said plates in successive rows, each of said means having a semi-circular form so as to constitute a circular bore for guiding a helical spring tie member transversely of said conveyor and around the proximate portions of said springs to tie the same, means to move a helical spring tie member through the circular bore of the guiding means and around the proximate portions of said springs to tie the same, means to intermittently move said conveyor member to bring a new row of plates and cooperating means into alinement with the path of movement of said helical spring tie member and means to move one plate relative to another to open the two halves of said bore in order to permit removal of said tie member therefrom.

13. In a spring conveying and assembling mechanism, a conveyor member including a series of linked plates, means on each of said plates to support a row of spiral springs with portions of springs in one row in proximity to opposed portions of springs in another row, each of said plates having opposed channels in adjacent edges thereof to form an opening intermediate the plates and adjacent the proximate portions of said springs and jaw members positioned to move through said opening to clamp the proximate portions of said spiral springs.

14. In a spring conveying and assembling mechanism, a conveyor member including a series of linked plates, means on each of said plates to support a row of spiral springs with portions of springs in one row in proximity to opposed portions of springs in another row, each of said plates having opposed channels in adjacent edges thereof to form an opening intermediate the plates and adjacent the proximate portions of said springs, jaw members positioned to move through said opening to clamp the proximate portions of sad spiral springs, and cooperating means on the adjacent edges of said plates for guiding a helical tie member through said jaw members and around the proximate portions of said spiral springs.

15. In a spring conveying and assembling mechanism, a conveyor member including a series of linked plates, means on each of said plates to support a row of spiral springs with portions of springs in one row in proximity to opposed portions of springs in another row, each of said plates having opposed channels in adjacent edges thereof to form an opening intermediate the plates and adjacent the proximate portions of said springs and jaw members positioned to move through said opening to clamp proximate portions of said spiral springs and semi-circular guiding members on opposed adjacent edges of said plates adapted to form a circular bore for guiding a helical tie member about the proximate portions of said spiral springs.

16. In a spring assembling machine, a conveyor member including a series of linked plates, means on each of said plates to support a row of spiral springs so that portions of springs in one row are positioned in proximity to corresponding portions of springs in a second row, semi-circular guiding members on the adjacent edges of said plates adapted to form a circular bore for guiding a helical tie member around the proximate portions of said springs, opposed channel portions in adjacent edge of each of said plates adapted to form an opening adjacent said proximate spring portions, a jaw member positioned to move through said opening to clamp said proximate portions of said spiral springs, means to move said helical tie member through said bore, means to close said jaws to clamp said proximate portions prior to the movement of said helical tie member and means to intermittently move said conveyor member to bring a new row of plates into alinement with the path of movement of said helical tie member and said jaws.

17. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to guide a helical spring tie member about the proximate portions of said spiral springs, means to move said helical tie member through said guide means, means to clamp the proximate portions of said spiral springs and retain the same together prior to the movement of the helical tie member, means to cut the helical tie member prior to a new period of movement of said conveyor and means to remove said helical member from said guide means.

18. In a spring assembling machine, a conveyor member, means to move said conveyor member for a definite period, means to arrest the movement of said conveyor member for a second definite period, means on said conveyor member for supporting a plurality of transversely extending rows of spiral springs, so that a portion of the upper and lower ends of said springs in one row are positioned in proximity to corresponding portions of springs in a second row, means to move a pair of helical spring tie members in a pair of fixed paths transversely of said conveyor and in alinement with the top and bottom proximate portions of said springs to tie the same during the period of rest of said conveyor, means to cut the helical tie members prior to a new period of movement of said conveyor and means to move clamping jaws about the upper and lower proximate portions of said springs during the period of rest of said conveyor and prior to the movement of the tie members so as to hold the proximate portions of said springs together while being tied by the helical tie members.

19. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of said springs in one row are positioned in proximity to corresponding portions of springs in a second row, means to move a pair of helical spring tie members transversely of said conveyor and in alinement with the top and bottom proximate portions of said springs to tie the same during the period of rest of said conveyor and means to move a guide means for the upper helical spring tie member into alinement with the proximate upper portions of said springs prior to the movement of said helical spring tie members.

20. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of the springs in one row are positioned in proximity to corresponding portions of the springs in a second row, means to move a pair of helical spring tie members transversely of said conveyor and in alinement with the top and bottom proximate portions of said springs to tie the same during the period of rest of said conveyor, means to move a guide means for the upper helical spring tie member into alinement with the proximate upper portions of said springs prior to the movement of said helical spring tie member, a second guide means carried by said conveyor member for guiding the lower helical tie member and means to cut both helical tie members prior to a new period of movement of said conveyor.

21. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of said springs in one row are positioned in proximity to corresponding portions of springs in a second row, means to move a pair of helical spring tie members transversely of said conveyor and in alinement with the top and bottom proximate portions of said springs to tie the same during the period of rest of said conveyor, means to move a guide means for the upper helical spring tie member into alinement with the proximate upper portions of said springs prior to the movement of said helical spring tie member, a second guide means carried by said conveyor member for guiding the lower helical tie member, means to cut both helical tie members prior to a new period of movement of said conveyor and a pair of jaw members adapted to clamp the upper proximate portions of said springs and movable with said upper guide member.

22. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of said springs in one row are positioned in proximity to corresponding portions of springs in a second row, means to move a pair of helical spring tie members transversely of said conveyor and in alignment with the top and bottom proximate portions of said springs to tie the same during the period of rest of said conveyor, means to move a guide means for the upper helical spring tie member into alinement with the proximate upper portions of said springs prior to the movement of said helical spring tie member, a second guide means carried by said conveyor member for guiding the lower helical tie member, means to cut both helical tie members prior to a new period of movement of said conveyor, and a pair of jaws each adapted to respectively clamp the upper and lower proximate portions of said springs, said upper jaw being movable with said movable guide member and said lower jaw being simultaneously movable through an opening in said conveyor member adjacent the lower proximate portions of said springs.

23. In a spring assembling machine including means to support a plurality of spring members with portions thereof in close proximity, a guiding and clamping member including a pair of movable jaws adapted to grasp proximate portions of adjacent springs and retain the same together, and a pair of guide members spaced from the first mentioned jaws movable therewith, and adapted to guide a helical tie member through said first mentioned jaws and about the proximate portions of said springs each of said guide members and jaw members having a semicircular bore so as to completely surround the helical tie member when guiding the same.

24. In a spring assembling machine, a conveyor member including a series of linked plates, means on each of said plates to support a row of spiral springs so that portions of springs in one row are positioned in proximity to corresponding portions of springs in a second row, guide means on adjacent edges of said plates adapted to form a guide bore for a helical tie member, said guide means extending above the surface of said plates and having cutaway portions conforming to the periphery of said springs and positioned to aline said springs with said guide bore to thereby guide a helical tie member about the proximate portions of said springs when said tie member is moved through said bore.

25. In a spring assembling machine, a conveyor member, including a series of linked plates, means on each of said plates to support a row of spiral springs so that portions of springs in one row are positioned in proximity to corresponding portions of springs in a second row, guide means on adjacent edges of said plates adapted to form a guide bore for a helical tie member, said guide means extending above the surface of said plates and having cutaway portions conforming to the periphery of said springs and positioned to aline said springs with said guide bore to thereby guide a helical tie member about the proximate portions of said springs when said tie member is moved through said bore, said plates having a plurality of openings adjacent the proximate portions of said springs and a plurality of jaw members adapted to pass through said openings to grasp the proximate portions of said springs and maintain the same in alinement with said guide bore.

26. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a helical spring tie member in a fixed path transversely of said conveyor and around the proximate portions of said springs to tie the same during the period of rest of said conveyor, means to move clamping members about the proximate portions of said springs during the period of rest of said conveyor so as to hold proximate portions together while being tied by said helical tie member, spring means for retaining said jaws in open position and means to close said jaws on the proximate portions of said springs prior to the movement of said helical spring tie member.

27. In a spring conveying and assembling mechanism, a movable conveyor member including a series of linked plates movable therewith, means on each of said plates to support a row of spiral springs with portions of the springs in one row in proximity to opposed portions of springs in another row and spring means adapted to retain said spiral springs on said plates so that a plurality of springs may be positioned and retained prior to a tying operation.

28. In a spring assembling machine a conveyor member including a series of linked plates, means on each of said plates to support a row of spiral springs so that portions of springs in one row are positioned in proximity to corresponding portions of springs in a second row, guide means on adjacent edges of said plates adapted to form a guide bore for a helical tie member, said guide means extending above the surface of said plates and having cutaway portions conforming to the periphery of said springs and positioned to aline said springs with said guide bore to thereby guide a helical tie member about the proximate portions of said springs when said tie member is moved through said bore and spring means adapted to retain said spiral springs on said plates.

29. In a spring conveying and assembling mechanism, a conveyor member including a series of linked plates, means on each of said plates to support a plurality of spiral springs with portions of the springs on one plate in proximity to opposed portions of springs on another plate, guiding means on each of said plates to assist in positioning the spiral springs thereon and an additional linked plate free from said guiding means and adapted to mark the end of a spring assembly.

30. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of said springs in one row are positioned in proximity to corresponding portions of springs in a second row, means to move a pair of helical spring tie members transversely of said conveyor and in alinement with the top and bottom proximate portions of said springs to tie the same during the period of rest of said conveyor, means to move a guide means for the upper helical spring tie member into alinement with the proximate upper portions of said springs prior to the movement of said helical spring tie members and means to open said upper helical guide means prior to a new period of movement of said conveyor member.

31. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of the springs in one row are positioned in proximity to corresponding portions of the springs in a second row, means to move a pair of helical spring tie members transversely of said conveyor and in alinement with the top and bottom proximate portions of said springs to tie the same during the period of rest of said conveyor, means to move a guide means for the upper helical spring tie member into alinement with the proximate upper portions of said springs prior to the movement of said helical spring tie member, a second guide means carried by said conveyor member for guiding the lower helical tie member, means to cut both helical tie members prior to a new period of movement of said conveyor, means to open said upper helical guide means prior to a new period of movement of said conveyor member and means to open said lower helical guide means to release said lower helical tie member and spring assembly.

32. In a spring assembling machine, a conveyor member, means to move said conveyor member for a definite period, means to arrest movement of said conveyor member for a second definite period, means on said conveyor member for supporting a plurality of transversely extending rows of spiral springs so that a portion of the upper and lower ends of the springs in one row are positioned in proximity to corresponding portions of the springs in a second row, means to move a pair of helical spring tie members transversely of said conveyor and in alinement with the top and bottom proximate portions of said springs to tie the same during the period of rest of said conveyor, means to move a guide means for the upper helical spring tie member into alinement with the proximate upper portions of said springs prior to the movement of said helical spring tie member, a second guide means carried by said conveyor member for guiding the lower helical tie member, means to cut both helical tie members prior to a new period of movement of said conveyor, means to open said upper helical guide means prior to a new period of movement of said conveyor member, means to open said lower helical guide means to release said lower helical tie member and spring assembly and means to strip said spring assembly from said conveyor after said lower guide means have been opened.

33. In a spring assembling machine, a conveyor member, means to move said conveyor member for a definite period, means to arrest the movement of said conveyor member for a second definite period, means on said conveyor member for supporting a plurality of transversely extending rows of spiral springs so that portions of the springs in one row are positioned in proximity to corresponding portions of springs in a second row, means to move a helical spring tie member in a fixed path transversely of said conveyor and around the proximate portions of said springs to tie the same during the period of rest of said conveyor, means to cut the helical tie member prior to a new period of movement of said conveyor, means to move clamping members about the proximate portions of said springs during the period of rest of said conveyor so as to hold the proximate portions of said springs together while being tied by said helical tie member, means to close said members on the proximate portions of said springs prior to the movement of said helical spring tie member and means carried by said cutting means to open said jaws.

34. In a spring assembling machine, a conveyor member, means on said conveyor member for supporting and positioning a plurality of spiral springs so that a plurality of the end coils of said springs are aligned in transverse rows relative to said conveyor with portions of the springs in one row positioned relatively closely to portions of the springs in the next row, as compared to the individual springs in each row, means to move said conveyor so that each of said rows is moved longitudinally of said machine in a series of steps and means to periodically feed a tie member between the closely positioned portions of said springs in each adjacent row, said last-mentioned means being operative between each stepped movement of said conveyor.

35. In a spring assembling machine, a conveyor member, means on said conveyor member for supporting and positioning a plurality of spiral springs so that a plurality of the end coils of said springs are aligned in transverse rows relative to said conveyor with portions of the springs in one row positioned relatively closely to portions of the springs in the next row, as compared to the individual springs in each row, means to move said conveyor so that each of said rows is moved longitudinally of said machine in a series of steps, means to periodically feed a tie member between the closely positioned portions of said springs in each adjacent row, and means to cut said tie member after the same is fed between said springs, said feeding and cutting means being operative between each stepped movement of said conveyor.

36. In a spring conveying and assembling mechanism, a conveyor member including a series of linked conveyor plates, means on each of said plates to support a spiral spring, cooperating means on the adjacent edges of said plates for guiding a spring tie member, and means to move said plates relative to one another to separate said cooperating means.

37. In a spring assembling machine, a series of conveyor members adapted to support and position a plurality of spiral springs, means to move said conveyor members for a definite period, means to arrest the movement of said conveyor members for a second definite period, means to feed a tie member between adjacent portions of the springs during the period of rest of said conveyor members, a plurality of tie member guides adapted to receive and guide said tie members, said guides having cooperating portions on adjacent conveyor members, and means to separate said cooperating portions to permit removal of said tie members during a period of movement of said conveyor members subsequent to the feeding of said tie members.

38. In a spring assembling machine, a conveyor member including a series of linked plates, means on each of said plates to support a row of spiral springs so that portions of the springs in one row are positioned in proximity to corresponding portions of springs in a second row, cooperating means carried by said plates for guiding a spring tie member, means to move said spring tie member through said cooperating guiding means and between the proximate portions of said springs to tie the same, and means to open said cooperating guiding means to permit the removal of said tie member therefrom.

JOSEPH A. SAVAL.